July 7, 1970 L. C. VERCELLOTTI 3,519,848
MEMORY SENSE AMPLIFIER CIRCUIT
Filed March 16, 1966
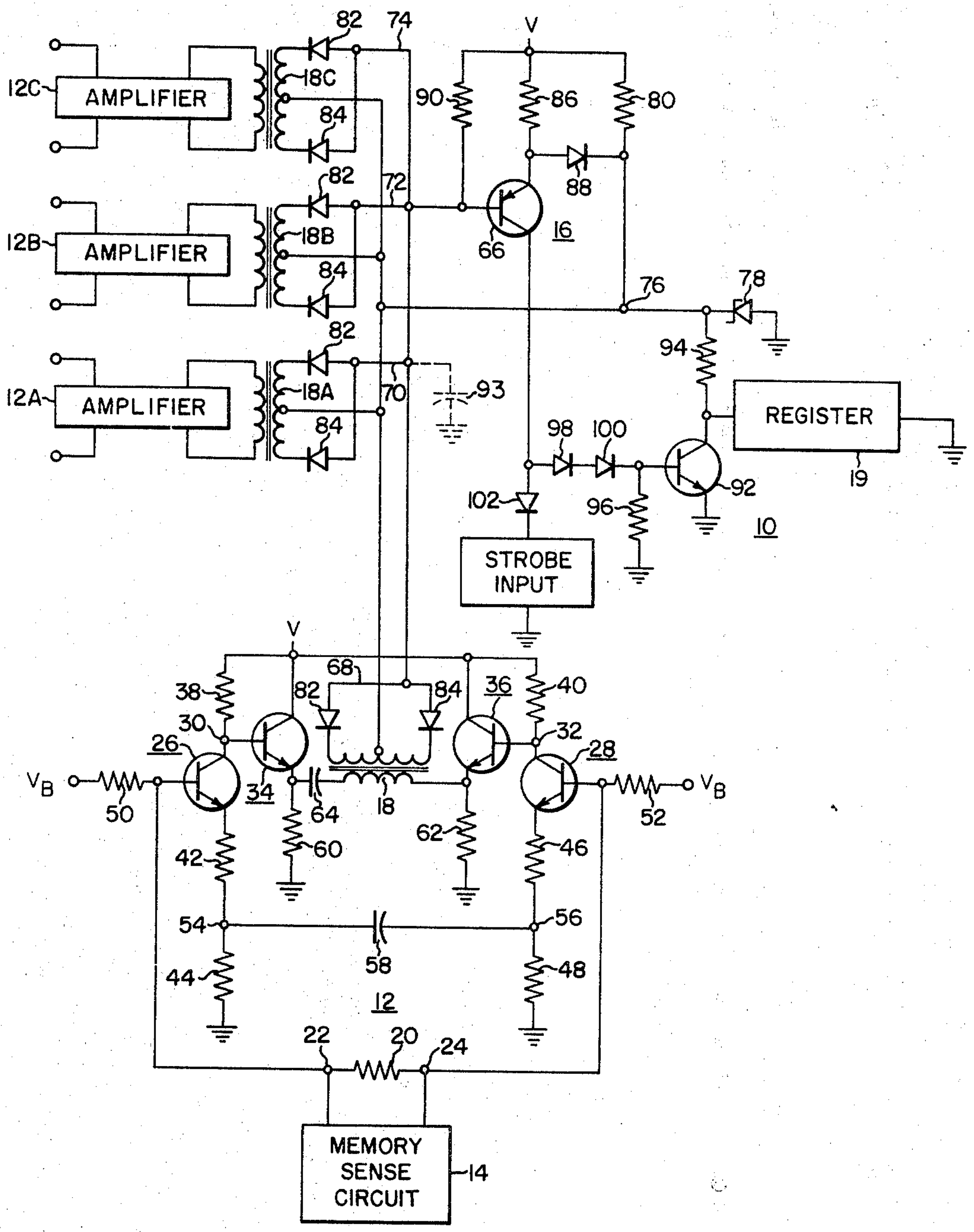
WITNESSES
Theodore F. Wrobel
James F. Young
INVENTOR
Leonard C. Vercellotti
BY E. F. Possessky
ATTORNEY United States Patent Office
3,519,848
Patented July 7, 1970

3,519,848
MEMORY SENSE AMPLIFIER CIRCUIT

Leonard C. Vercellotti, Penn Hills Township, Verona, Pa., assignor to Westinghouse Electric Corporation, Pittsburgh, Pa., a corporation of Pennsylvania Filed Mar. 16, 1966, Ser. No. 534,702
Int. Cl. H03k 5/20
U.S. Cl. 307—235 3 Claims

ABSTRACT OF THE DISCLOSURE

A sense amplifier circuit for a computer memory employs a common emitter balanced transistor amplifier which amplifies the normal mode sense winding signal output while substantially rejecting common mode sense winding signals. Emitter follower circuits couple the common emitter transistors to a transformer which is coupled along with similar transformers associated with other sense windings through noise rejecting threshold diode circuitry to a computer strobed output circuit.

BACKGROUND OF THE INVENTION

The present invention relates to computer circuitry and more particularly to circuitry used to sense and amplify memory read out signals for further computer processing.

A computer memory system typically may include a plurality of memory planes in which ferrite cores are used in a matrix to store binary information. In the memory core cycle, a computer address register typically directs select signals to a particular plane and core location and a core sense signal is generated if that core is in a predetermined binary state. The resultant sense signal must then be amplified to a usable voltage level, and during a subsequent part of the core cycle termed the "strobe time" the amplified signal is directed to register or other circuitry for use in the programmed operation of the computer.

The basic format of the memory sense amplifier circuitry can vary according to the system design of a particular computer. For a magnetic core memory, the sense circuitry typically includes a plurality of amplifier circuits, each of which is associated with a single memory plane since a single sense winding usually is common to all of the cores in a memory plane. The memory planes may be subgrouped into word memory units called stacks, and each plane may represent a particular bit of the stored program words. In order to provide common data register routing for core sense signals from memory planes having the same bit assignment in different core stacks, the memory sense amplifier circuitry further typically includes a separate output circuit for each group of amplifier circuits associated with common bit planes. Each output circuit and its associated amplifier circuits form a single sense amplifier circuit which accordingly directs amplified core sense signals from common bit planes to the same memory or flip-flop circuit in the data register. During any one core cycle, access is limited to a single core in each plane of a single stack.

The memory plane conductors typically carry a common mode voltage due to distributed inductive and capacitive effects. To optimize the reliability of computer functioning, variations in common mode voltage must be substantially rejected by the sense amplifier circuits as the normal mode core sense voltage is processed for further use. Prior art sense amplifier circuitry typically falls short of desired levels of common mode voltage rejection or requires excessive component specifications if acceptable common mode voltage rejection is to be realized.

When a sense amplifier circuit is used to service a group of memory stacks, noise voltage emitting from the memory stacks, and particularly the unselected memory stacks, can adversely affect the operation of the sense amplifier circuit particularly during its response to core information from the addressed stack. Prior art sense amplifier circuitry also typically lacks desirable capability for noise rejection.

SUMMARY OF THE INVENTION

In accordance with the principles of the present invention, a memory sense amplifier circuit comprises a balanced amplifier circuit which is coupled to a memory output such as a core sense winding and arranged to amplify normal mode memory sense signals and substantially reject common mode voltage changes. The amplifier circuit is coupled preferably through a transformer to an output circuit for computer strobing and register routing, and the output circuit includes a unique and economic level detecting arrangement which provides improved sense circuit noise rejection. A plurality of amplifier circuits can be coupled to the output circuit, and each is preferably a balanced alternating current amplifier circuit to process bipolar memory sense signals from respective memory sense outputs.

It is therefore an object of the invention to provide a novel memory sense amplifier circuit which operates with improved common mode voltage rejection.

Another object of the invention is to provide a novel memory sense amplifier circuit which operates with improved noise rejection.

A further object of the invention is to provide a novel memory sense amplifier circuit which is responsive to a plurality of memory planes with improved noise rejection.

An additional object of the invention is to provide a novel memory sense amplifier circuit which provides improved common mode voltage rejection with reduced coupling transformer requirements.

It is another object of the invention to provide a novel memory sense amplifier circuit which produces memory sense signal level detection with improved simplicity and economy.

These and other objects of the invention will become more apparent upon consideration of the following detailed description along with the attached drawing.

BRIEF DESCRIPTION OF THE DRAWINGS

The single figure shows a schematic diagram of a memory sense amplifier circuit arranged in accordance with the principles of the invention.

DESCRIPTION OF THE PREFERRED EMBODIMENT

More specifically, there is shown in the drawing a memory sense amplifier circuit 10 preferably formed with separate circuit components but integrated circuitry can be used as desired. The sense circuit 10 includes a preamplifier circuit 12, hereinafter termed an amplifier circuit, which is coupled at its input to the output of a memory sense circuit 14 such as the core sense winding of a ferrite core memory plane (not shown) in a stack (not shown) of a computer memory system (not shown). At its output, the amplifier circuit 12 is coupled to an output circuit 16 in which computer strobing is effected to transfer any sensed memory bit at a compatible voltage level to a register 19 or other suitable successive computer logic circuitry. The computer uses the entered register bits during its continued programmed operation.

As previously indicated, the computer memory system may have a predetermined number of memory stacks with a predetermined number of memory planes in each stack. A separate amplifier circuit can be coupled with each memory plane through its sense winding, and for reasons already described, a plurality of common bit amplifier circuits 12, 12A, 12B, and 12C are thus preferably employed with a single output circuit 16 to form the memory sense amplifier circuit 10. All of the memory planes in the computer memory system are thus subdivided into groups with each memory plane group associated with a single memory sense amplifier circuit 10.

A transformer preferably couples each amplifier circuit 12 with the output circuit 16. Thus, in the illustrated embodiment of the invention, a transformer 18 couples the amplifier 12 to the output circuit 16 and transformers 18A, 18B and 18C respectively couple the amplifier circuits 12A, 12B and 12C to the output circuit 16. The amplifier circuits 12A, 12B and 12C accordingly are associated with respective memory planes in respective memory plane stacks (not shown) other than the stack associated with the amplifier circuit 12. Since all of the amplifier circuits are identical, only the amplifier 12 will be described in detail.

At the input of the amplifier 12, a resistor 20 provides terminating impedance to damp high frequency oscillations from the memory sense circuit 14. Accordingly, a generated core sense signal of either polarity develops a normal mode voltage across the resistor 20 for processing by the sense amplifier circuit 10 and entry in the register 19. The resistor 20 preferably has a relatively low resistance value such as 100 ohms.

Since the core sense signals generated by the memory sense circuit 14 can have either polarity, the amplifier 12 preferably is an alternating current amplifier. Further, the amplifier 12 is preferably a balanced alternating current amplifier which attenuates common mode input voltage changes and amplifies normal mode difference voltages across the input resistor 20. As previously indicated, a common mode voltage is developed in the memory sense circuit 14 and it causes the potential at junctions 22 and 24 to exist at equal levels above a common reference or ground level. Changes in the common mode voltage therefore cause the potentials at the junctions 22 and 24 to change equally and simultaneously, whereas normal mode voltage developed across the resistor 20 by a core sense signal causes a corresponding difference in potential between the junctions 22 and 24.

The balanced amplifier 12 includes voltage amplifying elements 26 and 28 such as NPN transistors having collector terminals 30 and 32 coupled to the primary winding of the transformer 18 through emitter follower transistors 34 and 36. Collector voltage is applied to the amplifier transistors 26 and 28 through respective resistors 38 and 40 from an unregulated voltage supply V. To promote equal quiescent potentials at the transistor collector terminals 30 and 32 for balanced amplifier operation, the resistors 28 and 40 are substantially equal and have a resistance value such as 4.3 kilo-ohms.

Resistors 42, 44 and 46, 48 form divided resistance circuits between each amplifier transistor emitter and the common junction and are also respectively substantially identical. The resistors 42 and 46 preferably have a relatively low value such as 60 ohms and the resistors 44 and 48 preferably have a relatively high value such as 5 kilo-ohms. Typically, resistors having 1% tolerance in value can be used where substantially identical resistance is used for circuit balance.

The input resistor 20 is connected between the amplifier transistor base terminals, and base-emitter bias voltage is provided from a Zener diode voltage supply $V_B$ through respective resistors 50 and 52 which carry substantially equal quiescent base-emitter control currents. Changes in voltage at or across the input resistor 20 cause changes in the transistor base voltages, and in turn amplified changes are caused in the transistor collector voltages. However, normal mode voltages are amplified and coupled to the output circuit 16 while common mode voltage changes are attenuated.

In particular, a normal mode core sense voltage causes a difference in potential between the junctions 22 and 24 and between the amplifier transistor base terminals. A bypass capacitor 58 is provided with low impedance to normal mode voltage signals with a capacitance value such as 0.1 microfarad, and it is connected between division junctions 54 and 56 in the emitter divided resistance circuits. As one of the transistors 26 or 28 becomes more conductive because of the different base drive potentials caused by normal mode voltage, a difference in potential develops between the junctions 54 and 56. Normal mode signal current flows from the emitter of the more forward biased transistor through the capacitor 58 and subtracts from steady state current in the emitter circuit of the less forward biased transistor. An amplified normal mode voltage difference is thus created between the collector terminals 30 and 32.

For example, if a one-half microsecond normal mode core sense pulse near the beginning of a memory core cycle causes the junction 22 to become positive with respect to the junction 24, increased base-emitter current flows in the transistor 26 through the low valued resistor 42 and substantially bypasses the high valued resistor 44 to flow through the capacitor 58 and subtract from the current flowing through the resistor 46. With increased collector current flow in the transistor 26, the potential at the collector 30 drops below its quiescent value. At the same time, decreased collector current flow in the transistor 28 is accompanied by a rise in potential at the collector 32 above its quiescent value. When the normal mode voltage sense signal ends, the base potential of the transistors 26 and 28 return to normal, and quiescent amplifier operation is restored until a new normal mode voltage is sensed.

Normal mode collector voltage difference is coupled to the transformer 18 through emitter follower transistors 34 and 36. The emitter follower coupling to the transformer 18 provides impedance matching and limits the transformer flyback. A capacitor 64, which is connected in series with the primary winding of the transformer 18 can have a capacitance value such as .1 micro-farad to pass the high frequency normal mode voltage while blocking direct current flow through the transformer primary otherwise due to conditions of imbalance. It is further noted that the capacitors 58 and 64 together provide DC separation which enables the transistors 26 and 28 to be selected relatively freely from the standpoint of base-emitter characteristic matching.

Common mode voltage changes at the resistor 20 cause equal changes in the transistor base potentials and are accordingly substantially attenuated. Equally changed base emitter currents in the transistors 26 and 28 mutually prevent cross current flow though the capacitor 58 and accordingly cause equal changes in the potentials at the collectors 30 and 32. Thus, no voltage is developed across the transformer 18 when common mode voltage changes occur at the input resistor 20. Since common mode voltage is removed at the output of amplifier circuit 12, the transformer 18 can be selected with relatively reduced design requirements for common mode rejection.

Level detection and an AND logic function are produced in the register routing output circuit 16. Thus, a level detector switch or PNP transistor 66 is controlled by the secondary of the transformer 18 or any of the other transformer secondaries associated with loops 68, 70, 72 and 74. A central tap point in each transformer secondary is held at a reference potential of junction 76 which is stably maintained by a Zener diode 78 connected to the unregulated voltage supply V through a resistor 80 having a value such as 1 kilo-ohm and a rating such as 2 watts.

Threshold diodes 82 and 84 are connected to each transformer secondary winding to produce unidirectional transistor control voltages irrespectively of the polarity of transformer output voltage. Emitter current is supplied to the transistor 66 from the unregulated voltage supply V through a resistor 86 having a value such as 10 kilo-ohms. A diode 88 holds the emitter terminal of the transistor 66 at a fixed potential above the junction 76. Another resistor 90 having a value such as 15 kilo-ohms normally provides current flow through the diodes 82 and 84 to the common junction and further provides for discharge of distributed line capacitance represented by the reference character 93.

With no induced transformer secondary voltage, the base and emitter potentials of the transistor 66 are at substantially equal values above the potential of the junction 76. This is because the diodes are all forward biased with the base of the transistor 66 at the potential produced by the lowest forward drop threshold diode. The level detector transistor 66 is therefore nonconductive.

The forward voltage drop across any of the threshold diodes 82 or 84 must be exceeded by the associated transformer secondary voltage before the base of the transistor 66 is driven negative to cause emitter-collector current to flow. The threshold diodes 82 and 84 in conjunction with the transistor 66 thus provide a simple and economic voltage level detection to reject noise from the various amplifier circuits 12. Further, when a normal mode voltage signal is produced by an addressed memory stack and coupled to the output circuit 16 through one of the transformer secondaries, the noise from other stacks is non-additive, and the signal to noise ratio is approximately the same as that with a single stack.

An output transistor 92 is coupled to the level detector switch 66, and its pullup resistor in the collector circuit is supplied with current from the junction 76. The emitter terminal of the output transistor 92 is connected to the common junction, and a resistor 96 is connected between the base terminal of the transistor 92 and the common junction.

The collector terminal of the level detector switch 66 is connected to the base terminal of the transistor 92 through a pair of series connected diodes 98 and 100 to provide base drive therefor when another diode 102 is back biased by a computer strobe pulse which occurs shortly after the address register function in the same memory core cycle to provide time allowance for core switching and memory sense amplifier circuit operation. The use of a pair of diodes in the base drive circuit of the transistor 92 proovides assurance that current will be rediverted through the diode 102 when the strobe pulse is terminated.

When base drive current is supplied to the transistor 92, the collector voltage drops in value and the register 19 records the sensed and amplified core bit from the addressed memory stack and plane. Since the core readout is ordinarily characterized as a core destruct process, the sensed core may be reset to its original state after the strobe pulse time and at the completion of the memory core cycle. A new memory core cycle is then begun with the core addressing for readout of a new instruction bit.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A sense amplifier circuit for a memory system having a normal mode sense output circuit which carries a common mode voltage which may be of either a positive or negative polarity, said sense amplifier circuit comprising a balanced transistor amplifier circuit having an input connectable to the normal mode sense output, said amplifier circuit including a pair of transistor elements arranged in a common emitter configuration, means forming a part of said balanced amplifier circuit for attenuating common mode voltage changes and for amplifying normal mode voltages of either polarity, an output circuit for sense signal strobing, and means including a transformer for coupling said balanced amplifier circuit to said output circuit, wherein a circuit input resistor element is connected in a circuit branch between base connections of said transistor elements to accept signals from the sense output circuit, and said attenuating and amplifying means includes respective divided resistance circuits connected in the transistor base-emitter loops and a capacitor element connected between the division points of said divided resistance circuits.

2. A sense amplifier circuit for a memory system having a normal mode sense output circuit which carries a common mode voltage which may be of either a positive or negative polarity, said sense amplifier circuit comprising a balanced transistor amplifier circuit having an input connectable to the normal mode sense output, said amplifier circuit including a pair of transistor elements arranged in a common emitter configuration, means forming a part of said balanced amplifier circuit for attenuating common mode voltage changes and for amplifying normal mode voltages of either polarity, an output circuit for sense signal strobing, and means including a transformer for coupling said balanced amplifier circuit to said output circuit, wherein said coupling means further includes respective emitter follower transistor circuits coupling the outputs of said common emitter transistor elements across the primary winding of said transformer.

3. A sense amplifier circuit as set forth in claim 2 wherein a DC blocking capacitor is connected in series with the transformer primary between said emitter follower circuits.

References Cited

UNITED STATES PATENTS

| | | | |
|---|---|---|---|
| 2,996,627 | 8/1961 | Geyger | 307—88 |
| 3,025,414 | 3/1962 | McVey | 307—88.5 |
| 3,114,057 | 12/1963 | Caruso | 307—88.5 |
| 3,215,854 | 11/1965 | Mayhew | 307—88.5 |
| 3,243,705 | 3/1966 | Chenoweth | 324—127 |
| 3,304,512 | 2/1967 | McMillian | 330—30 |
| 3,305,729 | 2/1967 | Stein | 307—88.5 |
| 3,330,972 | 7/1967 | Malan | 307—88.5 |
| 3,386,041 | 5/1968 | Bell | 329—102 |
| 3,392,346 | 7/1968 | Staubus | 330—69 |
| 3,328,599 | 6/1967 | Stupar | 328—146 X |
| 3,389,340 | 6/1968 | Forbes | 328—155 |

DONALD D. FORRER, Primary Examiner

R. C. WOODBRIDGE, Assistant Examiner

U.S. Cl. X.R.

328—115, 146; 330—30, 69